United States Patent Office 3,462,455
Patented Aug. 19, 1969

3,462,455
SUBSTITUTED FLAVANE DERIVATIVES
Josef Krämer, Darmstadt, Karl-Otto Freisberg, Speyer, and Herbert Halpaap, Jugenheim, Germany, assignors to E. Merck A.G., Darmstadt, Germany
No Drawing. Filed Apr. 19, 1966, Ser. No. 543,558
Claims priority, application Germany, Apr. 23, 1965, M 64,983; Aug. 19, 1965, M 66,372
Int. Cl. C07d 7/30
U.S. Cl. 260—340.5      19 Claims

ABSTRACT OF THE DISCLOSURE

Certain flavanoid derivatives substituted at the 3-position by alkyl of 4–6 carbon atoms useful for lowering the cholesterol level.

---

This invention relates to substituted flavanoids.

An object of this invention therefore is to provide novel substituted flavanoids.

Another object is to provide one or more processes for the production of these derivatives, as well as novel intermediates therefor.

Additional objects include pharmaceutical compositions and methods of effecting therapeutic activities in mammals—based on the novel substituted flavanoids of this invention.

Upon further study of the specification and appended claims, other objects and advantages of this invention will become apparent.

To obtain these objectives, there are provided substituted flavanoids of Formula I

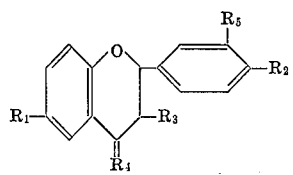

I wherein:
$R_1$ and $R_2$ each represents OH, alkoxy of 1–10 carbon atoms which can, if desired, be substituted, tetrahydropyranyl-(2)-oxy, acyloxy of 1–6 carbon atoms, $NO_2$, $NH_2$, alkylated $NH_2$ of a total of 1–8 carbon atoms, or acylamino of 2–6 carbon atoms;
$R_3$ is alkyl of 4–6 carbon atoms;
$R_4$ is O; H, OH; H, H; or H, $NH_2$; and
$R_5$ is H or $R_1$; or
$R_2$ and $R_5$ together can also represent methylenedioxy, ethylenedioxy, or propylenedioxy; and the residues $R_1$, $R_2$ and $R_5$ can be identical or different, as well as the acid addition salts and quaternary ammonium derivatives thereof.

These flavanoids exhibit a low toxicity, and possess very valuable pharmacological properties. In particular, they exhibit a cholesterol-level-lowering effect. On the other hand, estrogenic, ovario-stimulating, antispasmodic and/or cardioactive effects also occur.

For example, 3-n-amyl-6-hydroxy-4'-methoxy-flavanone effected a lowering of the cholesterol level in the serum of rats, amounting to the following:

Dosage of (mg.)—      Percent
25 ---------------------------------------- 22
50 ---------------------------------------- 40
100 --------------------------------------- 45

As compared to conventional cholesterol-level-lowering substances, for example 20,25-diazacholesterol, the novel flavanoids are distinguished by the fact that they do not cause a non-physiological accumulation of desmosterol or 7-dehydrocholesterol in the sterols of the serum or the liver.

The novel flavanoids can further be employed as intermediates for the preparation of further valuable compounds, for example compounds of Formula I containing at least one hydroxy group can be transformed into the corresponding sulfates and phosphates and into the ester salts of these compounds.

The novel flavanoids can further be employed as antioxidants, for instance in food stuffs for humans as well as for animals. Furthermore, the novel flavanoids are useful as UV absorbents, particularly for technical purposes; thus, they can be applied in paints, lacquers, plastics and synthetic resins.

The flavanoids of Formula I can be produced by the following reactions:

(A) A cyclization reaction is conducted with a compound of Formula II prepared, if desired, in situ

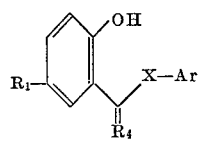

II wherein:
Ar is

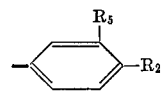

X represents —$CR_3$=CH— or —$CHR_3$—$CHX_1$—;
$X_1$ is OH, Hal, or amino; and
Hal is Cl, Br, or I;
$R_1$ to $R_5$ having the above-described meanings, and it being possible that phenolic hydroxy groups can also be present in protected form; or with a compound of Formula III

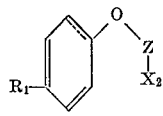

II wherein:
Z is —$CHR_3$—CHAr—;
$X_2$ is COOH, COHal, $CH_2OH$, or $CH_2Hal$; and
Ar, $R_1$, $R_2$, $R_3$, $R_5$, and Hal have the above-mentioned meanings;

(B) A reducing agent is reacted with a compound of Formula IV

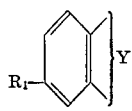

wherein:

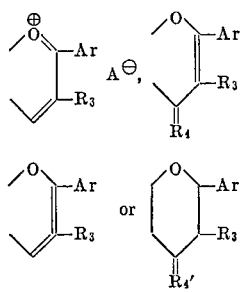

Y represents
$R_4'$ represents O or H, OH; and
$A^\ominus$ represents an anion of a strong acid,
Ar and $R_1$ to $R_5$ having the above-indicated meanings; and wherein phenolic hydroxy groups can be optimally attached in protected form in one or more places in the aromatic ring portions.

(C) In a compound defined by Formula I, protected hydroxy and/or amino groups are liberated by treatment with hydrolyzing and/or hydrogenolyzing agents, (D) In a compound defined by Formula I, free hydroxy and/or amino groups are alkylated or acylated by treatment with alkylating or acylating agents, (E) In a compound defined by Formula I nitro groups are reduced to amino groups, (F) In a compound defined by Formula I a keto group in the 4-position is converted into an amino group by oximation and subsequent reduction, (G) In a compound defined by Formula I a carboxylic acid group or a carboxylic acid alkyl ester group is converted, if desired in several stages, into a carboxylic acid amide group by treatment with aminating agents, and (H) Compounds of Formula I are converted, by treatment with acids or alkylating agents, into their respective physiologically compatible acid addition salts or quaternary ammonium compounds.

Suitable alkoxy groups in the residues $R_1$, $R_2$ and/or $R_5$ are, for example, the following: methoxy, ethoxy, propoxy, isopropoxy, butoxy, isobutoxy, sec.-butoxy, amyloxy, isoamyloxy, hexyloxy, isohexyloxy, heptyloxy, octyloxy, nonyloxy, decyloxy, but also allyloxy, benzyloxy, cyclopentyloxy and cyclohexyloxy. In this connection, alkoxy is defined broadly in accordance with the Encyclopedia of Chemical Science, 1964, Van Nostrand, wherein alkyl is defined as a generic name for any organic group or radical formed from a hydrocarbon by elimination of one atom of hydrogen and so producing a univalent unit. In addition, the alkoxy can be substituted by additional basic, acidic, or neutral substituents, preferred substituents being the following: amino; alkylated amino, such as dimethylamino, diethylamino, pyrrolidino, piperidino, morpholino; carboxy; carbalkoxy, such as carbomethoxy, carbethoxy; cyano; carboxyamido; dialkylcarboxamido, such as dimethyl- or diethylcarboxamido. Correspondingly, well suitable are groups, such as 2-dimethylaminoethoxy, 2-diethylaminoethoxy, 2-pyrrolidinoethoxy, 2-piperidinoethoxy, 2-morpholinoethoxy, 3-dimethylaminopropoxy, 3-diethylaminopropoxy, carboxymethoxy, carbalkoxymethoxy, such as carbomethoxymethoxy, carbethoxymethoxy, carbopropoxymethoxy, 2-carboxyethoxy, 3-carboxypropoxy, 4-carboxybutoxy, cyanomethoxy, 2-cyanoethoxy, carboxamidomethoxy, mono- and dialkylcarboxamido-methoxy of a total of 2–7 carbon atoms, such as dimethylcarboxamidomethoxy, diethylcarboxamidomethoxy, pyrrolidinocarbonylmethoxy, piperidinocarbonylmethoxy, morpholinocarbonylmethoxy, (2-hydroxyethylamino)-carbonylmethoxy, 2-carboxamidoethoxy, 2-(dimethylcarboxamido)-ethoxy. In the above-mentioned residues, additional double bonds can also be present.

If $R_1$, $R_2$ and/or $R_5$ represent acyloxy or acylamino groups, acyl residues are such which are derived from carboxylic acids of up to 6 carbon atoms, preferably formyl, acetyl, propionyl, butyryl, isobutyryl, valeryl, isovaleryl, caproyl, isocaproyl, nicotinoyl, isonicotinoyl, or picolinoyl. If $R_1$ and/or $R_2$ represent amino groups, these groups can be mono- or dialkylated; the alkyl residues in one amino group can have up to 8 carbon atoms. Preferred groups are methyl, ethyl n-propyl, isopropyl, n-butyl, isobutyl, amyl, hexyl, dimethyl, diethyl, di-n-propyl, diisopropyl, di-n-butyl, and/or diisobutylamino groups. The alkyl residues can also form a heterocyclic ring together with the nitrogen atom, for example a piperidine or pyrrolidine ring.

The residue $R_3$ is preferably n-butyl, isobutyl, secbutyl, n-amyl, isoamyl, n-hexyl, or isohexyl.

The residue $R_1$ can represent particularly the group $R_7$—CO—$CHR_6$—O— wherein $R_6$ is H or lower alkyl, such as methyl, ethyl, n-propyl, isopropyl, n-butyl, isobutyl, sec.-butyl, tert.-butyl, n-amyl or isoamyl, and $R_7$ is OH, lower alkoxy, such as methoxy, ethoxy, n-propoxy, isopropoxy, n-butoxy, isobutoxy, sec.-butoxy, tert.-butoxy, n-amyloxy, isoamyloxy, n-hexyloxy, $NH_2$, or alkylated amino, such as methyl, ethyl, n-propyl, isopropyl, n-butyl, isobutyl, amyl, hexyl, heptyl, dimethyl, methylethyl, diethyl, di-n-propyl, and diisopropylamino, 2-hyddoxyethylamino, pyrrolidino, piperidino, or morpholino.

The compounds of Formula IV encompass particularly flavylium salts, $\Delta^2$- and $\Delta^3$-flavenes, flavanols, flavanones, flavones, or flavonols which can be substituted as mentioned above. The flavylium salts of Formula IV can contain anions of acids of any desired strength; the flavylium salts can be present, for example, as chlorides, bromides, iodides, perchlorates, tetrachloroferrates (III), or hydrogen sulfates.

The flavane derivatives of Formula I are obtainable by cyclization of the compounds of Formula II.

Compounds of Formula II are especially the chalcones ($R_4$=0, X=—$CR_3$=CH—). However, well suitable for the cyclization are also compounds of Formula II wherein $R_4$ represents H, H.

The compounds of Formula II can be cyclized particularly by the effect of basic or acidic catalysts, to yield the flavane derivatives, of Formula I. Preferably used as catalysts are alkalis, such as sodium or potassium hydroxide, sodium amide, sodium hydride, basically reacting salts, such as sodium or potassium acetate, sodium or potassium carbonate; buffer solutions, for example those of citric acid and disodium phosphate, or of sodium or potassium dihydrogen phosphate and borax, or of boric acid, sodium hydroxide, and potassium chloride; organic bases, such as piperidine, pyridine, tetramethyl guanidine, benzyl trimethylammonium hydroxide; mineral acids, such as hydrochloric acid, hydrobromic acid, sulfuric acid, phosphoric acid, polyphosphoric acid; organic sulfonic acids, such as toluenesulfonic acid or camphor-sulfonic acid; and Lewis acids, such as aluminum chloride, zinc chloride, or tin tetrachloride.

The cyclization can be conducted in the presence of an additional inert solvent, such as methanol, ethanol, dioxane, tetrahydrofuran, ethyl acetate, acetic acid, tetralin, benzene, toluene, and also, if desired, in mixtures of these solvents with one another or with water. It is likewise possible to employ an excess of the cyclization agent as the solvent. The cyclization takes place at room temperature and can be accelerated by heating, if desired to the boiling point of the solvent employed. The reaction period is a few minutes up to a few days.

The chalcones are preferably obtained by condensation of a 2-hydroxyacylophenone substituted in the 5-position with a p-substituted (or 3,4-disubstituted) benzaldehyde, or also by reacting a p-substituted phenol and a p- (or 3,4-di-) substituted cinnamic acid derivative in the presence of aluminum chloride. It is not necessary to isolate the chalcone used as the starting material, but it is possible to react the 2-hydroxyacylophenone substituted in the 5-position and the substituted benzaldehyde with each other, and to treat the mixture directly with the cyclization agent.

A preferred group of novel 2-hydroxyacylophenones are the 2,5-dihydroxyacylophenones of the Formula A:

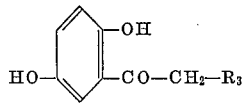

The starting compounds of Formula II ($R_4$=H, H) can be produced by condensing a hydroquinone derivative, which is, if desired, etherified or esterified, with a compound of the formula Hal—$CH_2$—X—Ar. It is possible to conduct the reaction in such a manner that the compound of Formula II need not be isolated. Furthermore, a compound of the formula:

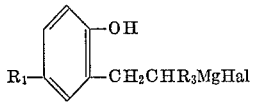

whose phenolic hydroxy group(s) can also be present in protected form, can be reacted with a benzaldehyde of the formula ArCHO to a compound of Formula II ($R_4$=H, H)

or a chalcone of the formula:

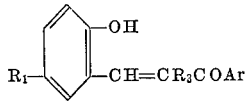

can be reduced to the compound of Formula II ($R_4$=H, H)

by treatment with a reducing agent, such as sodium amalgam, or by successive catalytic hydrogenation and reduction with a complex metallic hydride.

The cyclization of the compounds of Formula III is conducted normally by means of the same methods as the cyclization of the compounds of Formula II. such compounds of Formula III wherein $X_2$ represents COOH are preferably cyclized with acetyl chloride, phosphorus oxychloride, sulfuric acid, or polyphosphoric acid. Aluminum chloride or other Lewis acids serve for cyclizing the halogenides (III, $X_2$=COHal). It is, of course, possible to convert the acids, before the cyclization step, into the corresponding acid halogenides, for example by means of thionyl chloride. Also esters of these acids can be used for cyclization under hydrolyzing conditions.

It is not necessary to isolate the compounds of Formula III used as the starting materials, as they can also be produced in situ. This can be done, for example, by reacting a hydroquinone derivative, which is, if desired, etherified or esterified, with a halogen compound of the formula Ar—CHHal—$CHR_3$—$X_2$, under the conditions stated above for the cyclization of the compounds of Formula II. When working under mild alkaline conditions, for example by treatment with an alkali alcoholate, the compounds of Formula III can be isolated, if desired.

In the above-described reactions of the compounds of Formulae II and III, it is possible that phenolic hydroxy groups are present in protected form; and the protective groups can be subsequently split off. Thus, such compounds wherein hydroxy groups are present in protected form as tetrahydropyranyl ether, can be cyclized in an acidic or alkaline medium. In case of an alkaline cyclization, the hydroxy group is liberated by subsequent brief boiling with acid. Compounds having hydroxy groups protected in the form of esters can likewise be condensed in an acidic or alkaline medium, the ester group being saponified during this procedure. Furthermore, suitable as protective groups are ether groups, such as benzyl ether or methyl ether. The splitting of such ethers can be accomplished, for example, when using hydrobromic acid or hydriodic acid as the cyclization agent.

The flavane derivatives of Formula I can also be obtained by the reduction of compounds of Formula IV. Such a reduction can be conducted by catalytic hydrogenation, or by way of a chemical reaction. Suitable catalysts for the catalytic hydrogenation are, for example, noble metal, nickel, and cobalt catalysts, as well as copper-chromium-oxide. The noble metal catalysts can be present as support catalysts, such as, for example, palladium on charcoal, calcium carbonate, or strontium carbonate, as oxide catalysts, such as for example, platinum oxide, or as finely divided metal catalysts. Nickel and cobalt catalysts are suitably used in the form of Raney metals, nickel is also used on kieselguhr or pumice as the support.

The hydrogenation process can be conducted at room temperature and normal pressure, or also at increased temperature and/or superatmospheric pressure. Preferably, the process is conducted at pressures between 1 and 100 atmospheres and at temperatures between —80 and +150° C. Suitably, the reaction is carried out in the presence of a solvent, such as methanol, ethanol, isopropanol, tert.-butanol, ethyl acetate, dioxane, glacial acetic acid, tetrahydrofuran, or water. In some cases, it is also recommended to add catalytic amounts of a mineral acid, for example hydrochloric or sulfuric acid.

If a compound of Formula IV having a basic nitrogen atom is used for the hydrogenation, the free base, or also a salt of this base, can be employed. In the hydrogenation process, care must be taken that the aromatic rings are not likewise attacked. Preferably, the reaction is therefore conducted at normal pressure in such a manner that the hydrogenation is terminated after the stoichiometric quantity of hydrogen has been absorbed.

If starting compounds of Formula IV are employed wherein phenolic hydroxy groups are protected by benzyl groups, these protective groups can be removed during the hydrogenation.

Particularly amenable to production by catalytic hydrogenation are such compounds of Formula I wherein $R_4$=H,H.

The reduction of the compounds of Formula IV can also be accomplished with other reducing agents. Thus, it is possible to convert flavanones into flavanes of Formula I by employing diborane; for example, for this purpose, the flavanone is dissolved in diethylene glycol dimethyl ether, then diborane is introduced under cooling, and the mixture is allowed to stand overnight at room temperature. Furthermore, flavanones can be converted into their thioketals, predominantly into their ethylene thioketals, which are then reductively split, mainly by reaction with Raney metals.

It is further possible to conduct the reduction of a flavone in such a manner that simultaneously the keto-group in the 4-position is reduced to a CHOH— or to a $CH_2$-group. For example, the 4-hydroxy-flavane derivative is obtained by reduction with sodium or aluminum amalgam, or with Raney nickel in aqueous alcohol, the reaction being conducted at room temperature or under heating, or boiling. The reaction is then terminated after ½ hour to 3 days.

The starting compounds of Formula IV can be obtained according to conventional methods. For example, the flavylium salts are obtainable by condensation of a 2,5-dihydroxybenzaldehyde, which is, if desired, etherified, or esterified in the 5-position, with a ketone of the formula $R_3CH_2COAr$; the $\Delta^2$- or $\Delta^3$-flavenes are obtainable by reduction of the corresponding flavylium salts with lithium aluminum hydride; and the other compounds of Formula IV according to the methods described in the present application.

In a compound of Formula I, it is possible to convert one or several of the substituents $R_1$ to $R_5$ into other substituents $R_1$ to $R_5$.

Thus, it is possible to again liberate protected hydroxy and/or amino groups by hydrolysis or reduction. For example, esterified hydroxy groups, or hydroxy groups protected as tetrahydropyranyl or benzyl ethers and/or acylated amino groups can be hydrolyzed in a basic, neutral, or acidic medium. Suitable bases are particularly aqueous, aqueous-alcoholic, or alcoholic sodium or potassium hydroxide, preferred acids are hydrochloric and sulfuric acid. Benzyloxy, benzylamino, or benzalamino groups can be split hydrogenolytically.

It is furthermore possible to alkylate or acylate free hydroxy groups. Such hydroxy groups can be of a phenolic (in the 6-, 3'- and/or 4'-position) or of an alcoholic character (in the 4-position or as a substituent on an alkoxy group).

The etherification can be conducted, for example, by reacting with corresponding alkyl halogenides, sulfates, or lower alkyl esters in the presence of alkalis, such as sodium or potassium hydroxide or carbonate; in this connection, a conventional inert solvent can also be present. Important is the conversion of phenolic hydroxy groups into those alkoxy groups which still contain basic or acidic groups as substituents. Correspondingly, the phenolic starting compounds can be reacted, for example, with methyl iodide, dimethyl sulfate, ethyl, propyl, isopropyl, n-butyl, isobutyl, amyl, isoamyl halogenides, 2-dialkylaminoethyl halogenides, such as 2-dimethylaminoethyl, 2-diethylaminoethyl, 2-methylethylaminoethyl halogenides, 2-pyrrolidinoethyl, 2-piperidinoethyl, 2-morpholinoethyl, or 3-dialkylaminopropyl halogenides, or with the corresponding alcohols. Such etherification reactions are conducted, for example, in accordance with the principle of a Williamson synthesis, the corresponding alkali phenolates (sodium or potassium phenolates) being used as the starting point.

It is also possible, however, to react the free phenols with the corresponding alcohols, for example, substituted amino alcohols in the presence of acidic catalysts, such as sulfuric acid, phosphoric acid, p-toluenesulfonic acid. The phenolic OH— groups can also be etherified with halogen carboxylic acids, or the derivatives thereof, for example, esters, amides, nitriles. As a particular preferred embodiment, the residue $R_7$—CO—CHR$_6$—O can be introduced into the 6-position. Suitable halogen carboxylic acids are, for example, chloro- or bromoacetic acid, α-chloro- or α-bromopropionic acid, α-chloro- or α-bromobutyric acids, α-chloro- or α-bromovaleric acid, α-chloro- or α-bromocaproic acids, α-chloro- or α-bromoheptanoic acids, such as α-chlor- or α-bromisoamyl acetic acid, as well as the methyl and ethyl esters, amides, dialkylamides, or nitriles thereof.

An acylation of hydroxy groups can be conducted by heating with an anhydride or halogenide of the acetic, propionic, butyric, isobutyric, valeric, isovaleric, caproic, nicotinic, isonicotinic, or picolinic acid, advantageously in the presence of a base, such as pyridine, or an alkali salt of the corresponding acid, or also a small quantity of a mineral acid, such as sulfuric acid or hydrochloric acid.

Amino groups can be alkylated, for example, by reaction with the corresponding alkyl halogencied, such as methyl, ethyl, propyl, isopropyl, butyl, isobutyl halogenides, or with dimethyl or diethyl sulfate. Furthermore, amino groups, just as phenolic hydroxy groups, can be acylated with acid halogenides or anhydrides in the presence of bases, such as pyridine. A reduction of the thus-obtained acylamides, for example, with lithium aluminum hydride, in ether or tetrahydrofuran, leads to the corresponding monoalkylamines; any keto-groups present in the 4-position can likewise be reduced in this process step.

Still further, it is possible to reduce nitro groups in the 6-, 3'- and/or 4'-position to amino groups with catalytically activated hydrogen, or by other chemical means. Chemical reducing agents which are particularly suitable are metals, such as iron, zinc, tin, in the presence of acids, such as hydrochloric, sulfuric, or acetic acid; the addition of an inert organic solvent exhibits a favorable influence in the reducing process. A keto-group in the 4-position can be reductively removed or converted into a hydroxy group. In addition to one-step processes (catalytic hydrogenation, for example, on platinum oxide in glacial acetic acid or ethanol, reaction with aluminum amalgam, or with complex hydrides, such as lithium aluminum hydride, if desired in the presence of aluminum chloride or sodium borohydride), it is also possible to use multi-step processes. Thus, it is possible to convert the keto-group into the thioketal thereof, preferably the ethylene thioketal, which can then be split reductively, preferably by reacting the same with Raney metals.

It is also possible to convert a keto-group in the 4-position into the oxime and to reduce the latter, by a catalytic or chemical manner, to the corresponding amine. Suitable reducing agents are particularly complex hydrides like lithium aluminum hydride; an especially suitable catalyst for the hydrogenation is Raney nickel. The thus-obtained amine can be converted into the 4-hydroxy compound by treatment with nitrous acid.

In a compound of Formula I wherein $$R_1 = R_7 - CO - CHR_6 - O$$

the residue $R_7$ can also be converted into another residue $R_7$ by esterification, saponification, amidation or alkylation. An esterification is accomplished in the conventional manner with respect to such compounds wherein $R_7$ is a hydroxy group. For example, the reaction can be conducted with methanol or ethanol in the presence of acids, preferably in the presence of an organic solvent and with the use of azeotropic esterification methods, or also by treatment with diazomethane or diazoethane in ether, tetrahydrofuran, or dioxane. If the residue $R_7$ represents methoxy or ethoxy, it can be saponified according to the above-described methods, or it can be converted into the corresponding acid amides by reaction with ammonia or primary or secondary alkylamines, or, if desired, cyclic amines. If the residue $R_7$ represents free amino group, it can be converted, by reaction with the corresponding alkyl halogenides, such as methyl, ethyl, propyl, isopropyl, butyl, isobutyl, amyl, isoamyl halogenides, or with dimethyl or diethyl sulfate, or with 1,4-dichloro- or 1,4-dibromobutane, 1,5-dichloro- or 1,5-dibromopentane, into an alkylamino or dialkylamino group which can, if desired, also be cyclic.

Finally, it is possible to convert basic flavanoids of Formula I into the physiologically compatible acid addition salts thereof by treatment with acids. For this reaction, such acids are suitable which yield physiologically acceptable salts. Thus, organic and inorganic acids can be used, such as, for example, aliphatic, alicyclic, araliphatic, aromatic, or heterocyclic, mono- or polybasic carboxylic or sulfonic acids, such as formic acid, acetic acid, propionic acid, pivalic acid, diethylacetic acid, oxalic acid, malonic acid, succinic acid, pimeic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, isonicotinic acid, methanesulfonic acid, naphthalenemono- and -di-sulfonic acids, sulfuric acid, nitric acid, hydrohalic acids, such as hydrochloric or hydrobromic acid, or phosphoric acids, such as orthophosphoric acid.

Flavanoids of Formula I containing basic groups can likewise be converted into the physiologically compatible quaternary ammonium compounds thereof by treatment with alkylating agents, such as methyl iodide, dimethyl sulfate, or ethyl halogenides.

Preferably, according to the invention, compounds of the following letter-designated subgeneric groups are provided wherein $R_1$ through $R_5$ are the same as in Formula I, unless otherwise specified:

(A) $R_1$ represents $R_7$—CO—CHR$_6$—O, $R_6$ and $R_7$ having the previously indicated meanings;
(B) $R_5$ represents hydrogen;
(C) $R_5$ represents OH, alkoxy of a total of 1–10 carbon atoms which can, if desired, be substituted as previously indicated, tetrahydropyranyl-(2)-oxy, acyloxy of 1–6 carbon atoms, $NO_2$, $NH_2$, alkylated amino of a total of 1–8 carbon atoms, or acylamino of 2–6 carbon atoms;
(D) $R_3$ represents n-butyl, isobutyl, sec.-butyl, n-amyl, isoamyl, n-hexyl, or isohexyl;
(E) $R_2$ and $R_5$ represent OH, alkoxy of 1–5 carbon atoms, or acyloxy of 1–6 carbon atoms, or $R_2$ and $R_5$ together represent methylenedioxy; and
$R_3$ represents n-butyl, isobutyl, sec.-butyl, n-amyl, isoamyl, n-hexyl or isohexyl;
(F) $R_1$ represents OH or acetoxy; $R_2$ represents $OCH_3$; $R_3$ represents n-butyl, isobutyl, sec.-butyl, n-amyl, isoamyl, n-hexyl, or isohexyl; $R_4$ represents=O; $R_5$ represents H or $OCH_3$, or $R_2$ and $R_5$ together represent methylenedioxy; and
(G) $R_1$ represents OH or acetoxy; $R_2$ represents $OCH_3$; $R_3$ represents n-butyl, isobutyl, sec.-butyl, n-amyl, isoamyl, n-hexyl, or isohexyl; $R_4$ represents=O; and $R_5$ represents H.

The novel flavane derivatives can be employed in mixture with conventional excipients and administered to mammals. Carrier substances are such organic or inorganic compounds suitable for parenteral, enteral, or topical application and which do not react with the novel compounds, such as, for example, water, vegetable oils, polyethylene glycols, gelatin, lactic sugar, amylose, magnesium stearate, talc, Vaseline, cholesterol, etc. For parenteral application, particularly suitable are solutions, preferably oily or aqueous solutions, as well as suspensions, emulsions, or implants.

For enteral application, furthermore suitable are tablets or dragees which are also characterized by talc or a carbohydrate carrier or binder or the like. A syrup or the like can also be used wherein a sweetened vehicle is employed.

For topical application, liniments, salves or creams (viscous to semi-solid forms) are used which are, if desired, sterilized, or mixed with auxiliary agents, such as preservatives, stabilizers, or wetting agents, or salts for influencing the osmotic pressure, or with buffer substances.

The novel substances are preferably administered in a dosage of from 1 to 500 mg. per dosage unit, and the preferred content of pharmaceutical carrier per dosage unit ranges from 0.05 to 10 g.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

A solution of 2.1 g. 2,5-dihydroxyphenyl-n-amyl-ketone and 1.5 g. piperonal in 80 ml. absolute ethanol and 80 ml. absolute piperidine is boiled overnight, then stirred into water, made acidic with dilute hydrochloric acid, and extracted with chloroform. The organic phase is washed, dried, and concentrated by evaporation. From benzene-petroleum ether, there crystallizes 3-n-butyl-6-hydroxy-3',4'-methylene - dioxy - flavanone, M.P. 137–138° C.

Analogously, there are obtained:

with piperonal:

3-isobutyl-6-hydroxy-3', 4'-methylenedioxy-flavanone, M.P. 153–154° C.;
3-n-amyl-6-hydroxy-3',4'-methylenedioxy-flavanone, M.P. 122–123° C.;
3-n-hexyl-6-hydroxy-3',4'-methylenedioxy-flavanone, M.P. 99–100° C.;

with anisaldehyde:

3-n-butyl-6-hydroxy-4'-methoxy-flavanone, M.P. 112–114° C.;
3-isobutyl-6-hydroxy-4'-methoxy-flavanone, M.P. 130° C.;
3-n-amyl-6-hydroxy-4'-methoxy-flavanone, M.P. 103–105° C.;
3-n-hexyl-6-hydroxy-4'-methoxy-flavanone, M.P. 103–105° C.

The novel ketones used as the starting material are produced by heating hydroquinone for two hours to 125° C., in the acid saturated with boron trifluoride:

2,5-dihydroxyphenyl-n-amyl-ketone, M.P. 81–83° C.;
2,5-dihydroxyphenyl-isoamyl-ketone, M.P. 65–66° C.;
2,5-dihydroxyphenyl-n-hexyl-ketone, M.P. 50° C.;
2,5-dihydroxyphenyl-n-heptyl-ketone, M.P. 86–87° C.

Example 2

2.1 g. 2,5-dihydroxyphenyl-n-amyl-ketone and 1.5 g. piperonal are dissolved in 38 ml. ethanol and mixed dropwise with a solution of 20 g. potassium hydroxide in 14 ml. water. After a brief heating period to 40–50° C., the reaction mixture is allowed to stand for two days under a nitrogen atmosphere; then, it is stirred into water, made acidic with dilute hydrochloric acid, and extracted with chloroform. The solvent is distilled off under vacuum; the remaining 2',5'-dihydroxy-3,4-methylenedioxy - α - n-butyl-chalcone is dissolved in 13 ml. ethanol, mixed with 3.3 ml. water and 1.3 g. sodium acetate, and boiled for 2 hours on a steam bath. The reaction mixture is then stirred into water, extracted with ether, and the extract is washed with water and dried over sodium sulfate. The ether is distilled off, and the residue is recrystallized from ethanol; there is obtained 3-n-butyl - 6 - hydroxy - 3',4'-methylenedioxy-flavanone, M.P. 137–138° C.

Example 3

By boiling 1 g. 3-n-butyl-6-hydroxy-3',4'-methylenedioxy-flavanone for one hour with 5 ml. acetic anhydride and 5 ml. pyridine, cooling, working up with water and chloroform, and recrystallizing from methanol, there is obtained 3-n-butyl-6-acetoxy-3',4'-methylenedioxy - flavanone. Analogously, 3-n-butyl-6-propionoxy-, -6-butyryloxy-, -6-valeroyloxy-, and -6-caproyloxy-3',4'-methylenedioxy-flavanone are obtainable.

Example 4

3 g. 3-n-butyl-6,3',4'-trimethoxy-flavone are hydrogenated at 85° C. in 70 ml. ethanol with 5 g. Raney nickel as the catalyst for a period of twelve hours. The catalyst is filtered off, the solvent is distilled off, and the residue is chromatographed on neutral aluminum oxide. Elution with chloroform results in 3-n-butyl-6,3',4'-trimethoxy-flavanone and 3-n-butyl-4-hydroxy - 6,3',4' - trimethoxy-flavane, besides unreacted starting material.

Example 5

1 g. 3-n-butyl-6-hydroxy-3',4'-dimethoxy-flavone and 0.4 g. 5% palladium charcoal are heated in 40 ml. tetralin for 2 hours to 200° C. Then, the reaction mixture is cooled, the catalyst is filtered off, and the extract is washed three times with small quantities of ether and made acidic. The thus-obtained crude 3-n-butyl-6-hydroxy-3',4'-dimethoxy-flavanone is recrystallized from aqueous ethanol.

Example 6

To a suspension of 0.4 g. lithium aluminum hydride in 40 ml. absolute ether, there are added dropwise within 30 minutes 2 g. 3-n-butyl-6-hydroxy-3',4'-methylenedioxy-flavanone in 80 ml. absolute ether and 30 ml. of absolute tetrahydrofuran. After boiling for ½ hour, the lithium aluminum hydride excess is decomposed with ethyl acetate and subsequently mixed with extensively diluted hydrochloric acid. The organic phase is separated, washed, and dried. After the solvent has been removed by evaporation, there is obtained 3-n-butyl-4,6-dihydroxy-3',4'-methylenedioxy-flavane.

Example 7

A mixture of 1 g. 3-n-amyl-6-hydroxy-3',4'-methylenedioxy-flavanone and 0.3 g. sodium borohydride in 30 ml. ethanol is stirred for 10 hours at room temperature and is then made acidic with a small amount of acetic acid and concentrated under vacuum. The precipitating 3 - n - amyl-4,6-dihydroxy-3',4'-methylenedioxy-flavane is recrystallized from methanol.

Example 8

(a) 0.82 g. sodium acetate and 0.7 g. hydroxylamine hydrochloride are added to a solution of 3 g. 3-n-butyl-6-hydroxy-3',4'-methylenedioxy-flavanon in 60 ml. ethanol. After refluxing for three hours, the reaction mixture is cooled. The oxime which separates is filtered off, washed with water, and dried.

(b) A solution of 1.5 g. 3-n-butyl-6-hydroxy-3',4'-methylenedioxy-flavanone-oxime in 30 ml. absolute tetrahydrofuran is added to a suspension of 1 g. lithium aluminum hydride in 200 ml. absolute ether and subsequently boiled for 10 hours. Thereafter, 50 ml. solvent are distilled off under vacuum, and 100 ml. ethereal hydrochloric acid are added. The hydrochloride of 3-n-butyl - 4 - amino - 6 - hydroxy - 3',4' - methylenedioxyflavane precipitates.

Example 9

1.7 g. 3-isobutyl-6-hydroxy-4'-methoxy-flavanone, 0.9 g. bromoacetic acid ethyl ester (or 0.7 g. chloroacetic acid ethyl ester) and 0.7 g. potassium carbonate are refluxed for 24 hours in 15 ml. absolute acetone. The mixture is mixed with water and extracted with chloroform. From the extract there is obtained 3-isobutyl-4'-methoxy-flavanone-6-oxyacetic acid ethyl ester.

Example 10

0.2 g. 3-isobutyl-4'-methoxy-flavanone-6-oxyacetic acid ethyl ester is added to a solution of 0.1 g. pyrrolidine in 5 ml. absolute benzene and boiled for 6 hours. After cooling, crude 3 - isobutyl - 4'-methoxy-flavanone-6-oxyacetic acid pyrrolidide precipitates and is recrystallized from ethanol.

When conducting the reaction with morpholine, piperidine, or diethylamine, the corresponding morpholides, piperidides, and diethylamides are obtained.

Example 11

0.2 g. 3 - isobutyl-6-hydroxy-3',4'-methylenedioxy-flavanone is boiled for 24 hours with 0.9 g. decyl bromide and 0.1 g. anhydrous potassium carbonate in 5 ml. dry acetone. After the usual working-up operation, there is obtained 3 - isobutyl-6-decyloxy-3',4'-methylenedioxy-flavanone.

Example 12

7 g. platinum dioxide are pre-hydrogenated in 2.5 l. methanol and then mixed with 60 g. 3-n-hexyl-6-hydroxy-4'-methoxy-flavylium-chloride. The hydrogenation is continued until 2 mols hydrogen have been absorbed; then the reaction is terminated, and the methanol is distilled off under sub-atmospheric pressure. The residue is 3-n-hexyl-6-hydroxy-4'-methoxy-flavane.

Example 13

2 g. 3-isobutyl - 6 - hydroxy-4'-methoxy-3-flavene (obtained from 3-isobutyl-6-hydroxy-4'-methoxy-flavylium-chloride and lithium aluminum hydride) are hydrogenated in the presence of 500 mg. Raney nickel in 15 ml. ethanol. After the absorption of 1 mol hydrogen, the catalyst is filtered off, and the solvent is removed under decreased pressure; there is obtained 3-isobutyl-6-hydroxy-4'-methoxy-flavane.

Example 14

A solution of 1.5 g. 3-n-butyl-6-acetoxy-4'-methoxy-flavanone in 2 ml. ethanedithiol and 2 ml. boron trifluoride etherate is allowed to stand for 15 minutes at room temperature, and then, after the addition of 20 ml. chloroform, overnight. The reaction mixture is diluted with 200 ml. chloroform, washed with water and sodium chloride solution, and dried over sodium sulfate. The residue obtained after the chloroform has been removed is dissolved in 300 ml. absolute ethanol and refluxed for 10 hours with activated Raney nickel. After the catalyst has been filtered off, the solution is concentrated to 20 ml. The 3-n-butyl-6-ocetoxy-4'-methoxy-flavane which precipitates is recrystallized from methanol.

Example 15

2.4 g. 3-n-amyl-4,6-dihydroxy-4'-methoxy-flavane are dissolved in 100 ml. dioxane, mixed with 1.2 g. palladium chloride, and hydrogenated at room temperature. After the stoichometric amount of hydrogen has been absorbed, the hydrogenation reaction is terminated, the catalyst is filtered off, and the dioxane solution is concentrated under decreased pressure, diluted with water, and again concentrated for removing the residual dioxane. The crude product is recrystallized from ethanol, and there is obtained 3-n-amyl-6-hydroxy-4'-methoxy-flavane.

Example 16

2 g. 3-isoamyl-6-hydroxy-4'-methoxy-flavone are hydrogenated with 0.5 g. Raney nickel in 30 ml. ethanol at 120° C. under a hydrogen pressure of 40 atmospheres. After cooling, the catalyst is filtered off, and the filtrate is concentrated until 3-isoamyl-6-hydroxy-4'-methoxy-flavane crystallizes.

Example 17

4 g. hydroquinone, 8 g. p-methoxy-α-n-butyl-cinnamylbromide and 5 g. freshly melted zinc chloride are boiled for 6 hours under reflux in 55 ml. absolute benzene. Then the mixture is allowed to cool, the organic phase is washed with water, dried over sodium sulfate, and the solvent is removed under decreased pressure. The crude product is chromatographed on 20 g. aluminum oxide; there is obtained 3-n-butyl-6-hydroxy-4'-methoxy-flavane.

Example 18

2 g. 1 - p - anisyl - 2-(2-hydroxy-5-methoxy-benzyl)-actanol-(1) are heated to the boiling point, under reflux, in 10 ml. 2% methanolic hydrochloric acid for 4 hours. subsequently, the reaction mixture is concentrated under decreased pressure, and there is obtained 3-n-hexyl-6,4'-dimethoxy-flavane.

Example 19

2 g. 1 - (4 - hydroxyphenyl) - 2 - tert.-butyl-3-(2',5'-dimethoxyphenyl)-propanol are refluxed for 2 hours with a 5% solution of hydrogen bromide in 50 ml. glacial acetic acid. Then, the mixture is poured into water, extracted with chloroform, the extract washed with water, dried over sodium sulfate, and evaporated to dryness. There is obtained 3-tert.-butyl-6,4'-dihydroxy-flavane.

Example 20

2 g. 1-p-anisyl-2-(2-hydroxy-5-methoxy-benzyl)-heptyl-chloride are dissolved cold in 200 ml. 5% sodium hydroxide solution, and subsequently heated on a steam bath; there is obtained 3-n-amyl-6,4'-dimethoxy-flavane.

Example 21

3 g. 3-p-anisyl-3-p-anisyloxy-2-n-hexyl-propyl-chloride and 0.3 g. tin tetrachloride are heated in a bomb tube for 6 hours to 200° C. After cooling, the reaction mixture is worked up with ether and aqueous hydrochoric acid, the ether phase is washed with solution of sodium carbonate, dried over sodium sulfate, and the solvent is removed under decreased pressure; 6,4'-dimethoxy-3-n-hexyl-flavane is obtained.

Example 22

3 g. 3-p-anisyl-3-p-anisyloxy-2-isoamyl-propanol are heated with 0.3 g. zinc chloride in a bomb tube for 30 minutes to 200° C. After cooling, the reaction mixture is worked up with ether and aqueous hydrochloric acid, and there is obtained 6,4'-dimethoxy-3-isoamyl-flavane.

Example 23

2.6 g. 3-n-amyl-6-hydroxy-4'-methoxy-flavane, 1.5 g. chloroacetic acid diethylamide, and 2.8 g. anhydrous potassium carbonate are boiled in 50 ml. anhydrous acetone under a nitrogen atmosphere and with stirring for 24 hours. Then, the acetone is distilled off under decreased pressure, the residue is worked up with chloroform and water, and the thus-obtained 3-n-amyl-4'-methoxy-flavane-6-oxyacetic acid diethylamide is purified by recrystallization from ethanol.

Example 24

2 g. 3-isobutyl-4'-methoxy-flavanone-6-oxyacetic acid ethyl ester are refluxed for 3 hours with 30 ml. 2 N-ethanolic potassium hydroxide solution. Upon acidifying the solution with dilute sulfuric acid, there is obtained 3-isobutyl-4'-methoxy-flavanone-6-oxyacetic acid.

Example 25

(a) 1 g. 3-n-butyl-6-methoxy-4'-hydroxy-flavanone and 4 g. 2-pyrrolidinoethyl chloride are boiled under stirring for 20 hours with 1.2 g. anhydrous potassium carbonate in 40 ml. absolute acetone. The reaction mixture is concentrated, water and ether are added, the layers are separated, the organic phase is dried over potassium hydroxide, evaporation is conducted to concentrate the organic phase, and then the organic phase is chromatographed on aluminum oxide. Upon eluation with chloroform, 3-n-butyl-6-methoxy-4'-(2-pyrrolidinoethoxy)-flavanone is obtained.

(b) 0.2 g. 3-n-butyl-6-methoxy-4'-(2-pyrrolidinoethoxy)-flavanone is dissolved in a small quantity of ethanol and mixed with excess ethanolic hydrochloric acid. The hydrochloride of the base, which precipitates, is filtered off.

Analogously, the corresponding hydrobromide can be produced by using hydrogen bromide.

(c) 0.5 g. 3-n-butyl - 6 - methoxy-4'-(2 - pyrrolidinoethoxy)-flavanone are dissolved in ether and mixed with an excess of methyl iodide. The reaction mixture is allowed to stand at room temperature for 24 hours, is worked up in the usual manner, and the methoiodide of the base is recrystallized from methanol.

Example 26

A solution of 2.6 g. 2,5-dihydroxyphenyl-n-hexylketone-5-tetrahydropyranyl-ether (obtained by boiling, for 30 minutes, 2,5-dihydroxyphenyl-n-hexyl-ketone with dihydropyrane and a few drops of hydrochloric acid) and 1.9 g. p-isoamyloxy-benzaldehyde in 19 ml. ethanol is agitated for 5 minutes with 12 g. hot (ca. over 35° C.) 50% sodium hydroxide solution, mixed with water, and the precipitate is filtered off and recrystallized from ethanol. The thus-obtained tetrahydropyranyl ether of 3-n-amyl-6-hydroxy-4'-isoamyloxy-flavanone is boiled for 2½ hours with 5% aqueous-alcoholic hydrochloric acid, stirred into water, and the mixture is extracted with chloroform. After the chloroform has been removed by evaporation, the crude 3-n-amyl-6-hydroxy-4'-isoamyloxy-flavanone is recrystallized from ethanol.

Example 27

Analogously to Example 1, the following compounds are obtainable from the corresponding 2,5-dihydroxyphenyl-alkyl-ketones and the corresponding substituted benzaldehydes:

3-sec.-butyl-6-hydroxy-4'-methoxy-flavanone
3-tert.-butyl-6-hydroxy-4'-methoxy-flavanone
3-isoamyl-6-hydroxy-4'-methoxy-flavanone
3-isohexyl-6-hydroxy-4'-methoxy-flavanone
3-n-butyl-6-hydroxy-4'-ethoxy-flavanone
3-n-butyl-6-hydroxy-4'-isopropoxy-flavanone
3-n-butyl-6-hydroxy-4'-isobutoxy-flavanone
3-n-butyl-6-hydroxy-4'-isoamyloxy-flavanone
3-n-butyl-6-hydroxy-4'-(2-dimethylaminoethoxy)-flavanone
3-n-butyl-6-hydroxy-4'-(3-dimethylaminopropoxy)-flavanone
3-n-butyl-6,4'-dihydroxy-flavanone
3-n-butyl-6-hydroxy-3',4'-ethylenedioxy-flavanone
3-n-butyl-6-hydroxy-3',4'-propylenedioxy-flavanone
3-sec.-butyl-6-hydroxy-3',4'-methylenedioxy-flavanone
3-tert.-butyl-6-hydroxy-3',4'-methylenedioxy-flavanone
3-isoamyl-6-hydroxy-3',4'-methylenedioxy-flavanone
3-isohexyl-6-hydroxy-3',4'-methylenedioxy-flavanone
3-n-butyl-6-hydroxy-3',4'-dimethoxy-flavanone
3-isobutyl-6-hydroxy-3',4'-dimethoxy-flavanone
3-sec.-butyl-6-hydroxy-3',4'-dimethoxy-flavanone
3-tert.-butyl-6-hydroxy-3',4'-dimethoxy-flavanone
3-n-amyl-6-hydroxy-3',4'-dimethoxy-flavanone
3-isoamyl-6-hydroxy-3',4'-dimethoxy-flavanone
3-n-hexyl-6-hydroxy-3',4'-dimethoxy-flavanone
3-isohexyl-6-hydroxy-3',4'-dimethoxy-flavanone
3-n-butyl-6,4'-dihydroxy-3'-methoxy-flavanone
3-isobutyl-6,4'-dihydroxy-3'-methoxy-flavanone
3-n-amyl-6,4'-dihydroxy-3'-methoxy-flavanone
3-isoamyl-6,4'-dihydroxy-3'-methoxy-flavanone
3-n-amyl-6,4'-dihydroxy-3'-methoxy-flavanone
3-isobutyl-6,3',4'-trimethoxy-flavanone
3-n-amyl-6,3',4'-trimethoxy-flavanone
3-isoamyl-6,3',4'-trimethoxy-flavanone
3-n-butyl-6-hydroxy-4'-nitro-flavanone
3-n-butyl-6-hydroxy-4'-dimethylamino-flavanone
3-n-butyl-6-hydroxy-4'-(di-n-butylamino)-flavanone
3-n-amyl-6-hydroxy-4'-acetamido-flavanone

Example 28

Analogously to Example 3, the following compounds are obtainable by acetylation of the corresponding 6-hydroxy-flavanoids:

3-n-butyl-, 3-isobutyl-, 3-sec.-butyl-, 3-tert.-butyl-, 3-n-amyl-, 3-isoamyl-, 3-n-hexyl- and 3-ishexyl-6-acetoxy-4'-methoxy-flavanone;

3-isobutyl-, 3-sec.-butyl-, 3-tert.-butyl-, 3-n-amyl-, 3-isoamyl-, 3-n-hexyl-, and 3-isohexyl-6-acetoxy-3',4'-methylenedioxy-flavanone;

3-n-butyl-, 3-isobutyl-, 3-sec.-butyl-, 3-tert.-butyl-, 3-n-amyl-, 3-isoamyl, 3-n-hexyl, and 3-isohexyl-6-acetoxy-3',4'-dimethoxy-flavanone; 3-n-butyl-, 3-isobutyl-, 3-n-amyl-, 3-isoamyl-, and 3-n-hexyl-6-acetoxy-4'-methoxy-flavane.

Example 29

Analogously to Example 9, the following compounds are obtained by reacting the corresponding 6-hydroxy-flavanoids with bromo- or chloroacetic acid ethyl ester:

3-n-butyl-, 3-n-amyl-, 3-isoamyl-, 3-n-hexyl-, and 3-isohexyl-4'-methoxy-flavanone-6-oxyacetic acid ethyl ester;

3-n-butyl-, 3-isobutyl-, 3-n-amyl-, 3-isoamyl-, 3-n-hexyl-, and 3-isohexyl-3',4'-methylenedioxy-flavanone-6-oxyacetic acid ethyl ester; and 3-n-butyl-, 3-isobutyl-, 3-n-amyl-, and 3-n-hexyl-3',4'-dimethoxy-flavanone-6-oxyacetic acid ethyl ester.

These esters can be converted analogously to Example 10 into the corresponding pyrrolidides, morpholides, piperidides, or diethylamides, or they can be saponified analogously to Example 24 to the free acids.

Example 30

0.5 g. of 3-n-amyl-6-hydroxy-4'-acetamido-flavanone are boiled for 8 hours in 25 ml. 10% methanolic hydrochloric acid and concentrated by evaporation.

There is obtained the hydrochloride of 3-n-amyl-6-hydroxy-4'-amino-flavanone.

Example 31

(a) Condensation of 2,5 - dihydroxyphenyl-n-amyl-ketone with benzyl vanillin analogously to Example 1 yields 3 - n - butyl - 6 - hydroxy - 3' - methoxy - 4' - benzyloxy-flavanone.

(b) 1 g. of this compound is dissolved in 50 ml. ethyl acetate saturated with hydrogen chloride, and hydrogenated on 5% palladium charcoal at 35° C. until the stoichiometric amount of hydrogen has been absorbed. The catalyst is filtered off, and the solvent is removed. There is obtained 3 - n - butyl - 6,4' - dihydroxy - 3' - methoxy-flavanone.

Example 32

(a) 0.6 g. 3-n-butyl-6-hydroxy-4'-nitro-flavanone are boiled for 4 hours with 2 g. iron powder in a mixture of 50 ml. acetone and 20 ml. 10% acetic acid. The mixture is filtered in the hot state. From the filtrate there is separated during cooling 3-n-butyl-6-hydroxy-4'-amino-flavanone.

(b) 0.3 g. 3-n-butyl-6-hydroxy-4'-amino-flavanone are allowed to stand for 24 hours at room temperature with 2 ml. acetic anhydride and 2 ml. pyridine. The mixture is stirred into ice water, and the precipitated 3-n-butyl-6-acetoxy-4'-acetamido-flavanone is vacuum-filtered and recrystallized from ethanol.

The following examples cover suitable pharmaceutical compositions which can be prepared according to conventional procedures.

Example 33

Tablets:                                          Mg.
  3-n-amyl-6-hydroxy-4'-methoxy-flavanone _____    5
  Lactose _____   65
  Potato starch _____   40
  Talc _____    8
  Magnesium stearate _____    2

Example 34

Coated tablets:                                   Mg.
  3-n-amyl-6-hydroxy-4'-methoxy-flavanone _____    5
  Lactose _____   95
  Talc _____   10

The coating consists of a mixture of cane sugar, talc, corn starch and tragacanth. Its weight is about 120 mg.

Example 35

Solution for injection: Ampoules containing 2 mg. 3-n-amyl-6-hydroxy-4'-methoxy-flavanone in 1 ml. of sesame oil are prepared in the conventional manner and sealed.

In place of the substance cited in Examples 33 to 35, it is also possible to incorporate other compounds covered by Formula I as well as the acid addition and quaternary ammonium salts thereof into analogous or similar preparations.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A member selected from the group consisting of a compound of the following formula, an acid addition salt thereof and a quaternary ammonium salt thereof

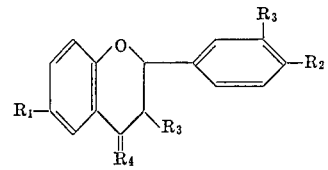

wherein:

$R_1$ and $R_2$ each represents OH, tetrahydropyranyl-(2)-oxy, carboxylic acid acyloxy of 1-6 carbon atoms, $NO_2$, $NH_2$, alkylated amino of 1-8 carbon atoms, carboxylic acid acylamino of 2-6 carbon atoms, unsubstituted alkoxy of 1-10 carbon atoms, and substituted alkoxy of 1-10 carbon atoms wherein the substituted substituents are selected from the group consisting of amino, alkylated amino of 1 to 8 carbon atoms, carboxy, carbalkoxy of 2 to 8 carbon atoms, cyano, carboxamido, and dialkylcarboxamido of which each alkyl is of 1-4 carbon atoms;

$R_3$ represents alkyl of 4-6 carbon atoms;

$R_4$ represents =O; H, OH; H,H, or $H,NH_2$;

$R_5$ represents H or $R_1$, or together with $R_2$ methylenedioxy, ethylenedioxy, or propylenedioxy.

2. A member as defined by claim 1, wherein $R_1$ is $R_7$—CO—$CHR_6$—O—, $R_6$ representing H or lower alkyl, and $R_7$ representing OH, lower alkoxy, $NH_2$, or alkylated amino of 1-8 carbon atoms.

3. A member as defined by claim 1, wherein $R_5$ is hydrogen.

4. A member as defined by claim 1, wherein $R_5$ is OH, tetrahydropyranyl-(2)-oxy, acyloxy of 1-6 carbon atoms, $NO_2$, $NH_2$, alkylated amino of 1-8 carbon atoms, acylamino of 2-6 carbon atoms, unsubstituted alkoxy of 1-10 carbon atoms, and substituted alkoxy of 1-10 carbon atoms wherein the substituted substituents are selected from the group consisting of amino, alkylated amino of 1 to 8 carbon atoms, carboxy, carbalkoxy of 2 to 8 carbon atoms, cyano, carboxamido, and dialkylcarboxamido of which each alkyl is of 1-4 carbon atoms.

5. A member as defined in claim 1, wherein $R_3$ is n-butyl, isobutyl, sec.-butyl, n-amyl, isoamyl, n-hexyl, or isohexyl.

6. A member as defined by claim 5, wherein $R_2$ and $R_5$ each represents OH, alkoxy of 1-5 carbon atoms, or $R_2$ and $R_5$ together represent methylenedioxy.

7. A member as defined by claim 5, wherein $R_1$ represents OH or acetoxy, $R_2$ is $OCH_3$, $R_4$ is =O, $R_5$ represents H or $OCH_3$, or together with $R_2$ methylenedioxy.

8. A member as defined by claim 5, wherein $R_1$ represents OH or acetoxy, $R_2$ is $OCH_3$, $R_4$ is =O; and $R_5$ is H.

9. A member as defined by claim 1, wherein said member is 3-n-butyl-6-hydroxy-4'-methoxy-flavanone.

10. A member as defined by claim 1, wherein said member is 3-isobutyl-6-hydroxy-4'-methoxy-flavanone.

11. A member as defined by claim 1, wherein said member is 3-n-amyl-6-hydroxy-4'-methoxy-flavanone.

12. A member as defined by claim 1, wherein said member is 3-isoamyl-6-hydroxy-4'-methoxy-flavanone.

13. A member as defined by claim 1, wherein said member is 3-n-hexyl-6-hydroxy-4'-methoxy-flavanone.

14. A member as defined by claim 1, wherein said member is 3-n-butyl-6-hydroxy-3',4'-methylenedioxy-flavanone.

15. A member as defined by claim 1, wherein said member is 3-isobutyl-6-hydroxy-3',4'-methylenedioxy-flavanone.

16. A member as defined by claim 1, wherein said member is 3-n-amyl-6-hydroxy-3',4'-methylenedioxy-flavanone.

17. A member as defined by claim 1, wherein said member is 3-isoamyl-6-hydroxy-3',4'-methylenedioxy-flavanone.

18. A member as defined by claim 1, wherein said member is 3-n-hexyl-6-hydroxy-3',4'-methylenedioxy-flavanone.

19. A member as defined by claim 1, wherein said member is selected from the group consisting of:
3-n-butyl-6-acetoxy-4'-methoxy-flavanone,
3-isobutyl-6-acetoxy-4'-methoxy-flavanone,
3-n-amyl-6-acetoxy-4'-methoxy-flavanone,
3-isoamyl-6-acetoxy-4'-methoxy-flavanone,
3-n-hexyl-6-acetoxy-4'-methoxy-flavanone,
3-n-butyl-6-acetoxy-3',4'-methylenedioxy-flavanone,
3-isobutyl-6-acetoxy-3',4'-methylenedioxy-flavanone,
3-n-amyl-6-acetoxy-3',4'-methylenedioxy-flavanone,
3-isoamyl-6-acetoxy-3',4' - methylenedioxy - flavanone, and
3-n-hexyl-6-acetoxy-3',4'-methylenedioxy-flavanone.

References Cited

Russell: Jour. Chem. Soc., pp. 218–21 (1934).
Row et al.: J. Indian Chem. Soc., vol. 40, pp. 521–4 (1963).
Shah et al.: Chemische Berichte, vol. 97, pp. 1453–7 (1964).
Fischer et al.: Chemische Berichte, vol. 97, pp. 1910–14 (1964).

HENRY R. JILES, Primary Examiner

J. M. FORD, Assistant Examiner

U.S. Cl. X.R.

167—65; 260—247.2, 247.5, 247.7, 294, 294.7, 295, 295.5, 326.8, 326.85, 340.3, 345.2, 345.5, 345.9, 519, 520, 544, 570, 571, 592, 612, 613, 619, 624, 625